US010550995B1

(12) United States Patent
Hung et al.

(10) Patent No.: US 10,550,995 B1
(45) Date of Patent: Feb. 4, 2020

(54) DISPLAY DEVICE HAVING A ROTARY COVER STRUCTURE

(71) Applicant: CAL-COMP BIG DATA, INC., New Taipei (TW)

(72) Inventors: Ming-Hua Hung, New Taipei (TW); Teng-Nan Lo, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 0 days.

(21) Appl. No.: 16/518,959

(22) Filed: Jul. 22, 2019

(30) Foreign Application Priority Data

May 21, 2019 (TW) .................................. 108206373

(51) Int. Cl.
| | | |
|---|---|---|
| *F16M 11/10* | (2006.01) | |
| *F16M 13/00* | (2006.01) | |
| *G06F 1/16* | (2006.01) | |
| *H04M 1/02* | (2006.01) | |
| *H04M 1/04* | (2006.01) | |

(52) U.S. Cl.
CPC ........ *F16M 11/105* (2013.01); *F16M 13/005* (2013.01); *G06F 1/1626* (2013.01); *H04M 1/0227* (2013.01); *H04M 1/0233* (2013.01); *H04M 1/0237* (2013.01); *H04M 1/04* (2013.01)

(58) Field of Classification Search
CPC .. F16M 11/105; F16M 13/005; F16M 13/001; G06F 1/1626; G06F 1/1628; H04M 1/0227; H04M 1/0233; H04M 1/0237; H04M 1/04; H04M 1/0218; H04M 1/0245; H04M 1/0252; H04B 1/3888; A45C 11/00; A45C 2011/002; A45C 2013/001; B65D 85/00
USPC ............... 455/575.8, 575.1; 384/26; 361/679
See application file for complete search history.

(56) References Cited

U.S. PATENT DOCUMENTS

| | | | | |
|---|---|---|---|---|
| 2011/0299235 | A1* | 12/2011 | Liu ..................... | H04M 1/0237 361/679.09 |
| 2012/0314980 | A1* | 12/2012 | Chen ................... | H04M 1/0237 384/26 |
| 2015/0296060 | A1* | 10/2015 | Gu ...................... | H04M 1/0235 455/575.4 |
| 2016/0285305 | A1* | 9/2016 | Yamanaka ........... | H04B 1/3888 |

* cited by examiner

*Primary Examiner* — Anthony S Addy
*Assistant Examiner* — Farid Seyedvosoghi
(74) *Attorney, Agent, or Firm* — Chun-Ming Shih; HDLS IPR Services

(57) ABSTRACT

A display device having rotary cover structure includes: a display main body (1), having a display screen (11) and a back cover (12), two slide rails (13) arranged at two sides of the display screen (11), and a side edge part (14) arranged between the two slide rails (13); two rotation shaft assemblies (2), disposed at the side edge part (14), and having two rotation shafts (21) disposed corresponding to the two slide rails (13); an axial core line (L2) of each the rotation shaft (21) is arranged to be parallel to a central line (L1) of the side edge part (14); and a slide cover (3), having two slide blocks (31) sliding along the two slide rails (13) and capable of being displaced between a shielding position for shielding the display screen (11) and an exposing position allowing the display screen (11) to be exposed.

4 Claims, 7 Drawing Sheets

DISPLAY DEVICE HAVING A ROTARY COVER STRUCTURE

BACKGROUND OF THE INVENTION

1. Technical Field

The technical field relates to a display device with a rotary slide cover, especially to a display device having rotary cover structure.

2. Description of Related Art

With the rapid growth of mobile device, for example a mobile phone or a tablet computer, a user mostly uses the mobile device to enjoy the leisure time for reading, taking photos, playing games or watching videos. Wherein, the mobile device is vertically placed while being operated, when the user wants to play games or watch a video, the mobile device is required to be transversally placed for allowing the user to conveniently watch a display screen of the mobile device.

However, if a slide cover is disposed on the mobile device, the slide cover may easily downwardly slide to shield the display screen due to the gravity when the mobile device is transversally placed, and the user does not want to hold the mobile device with his/her hands when he/she is playing games or watching a video. As such, how to avoid the slide cover from downwardly slide to shield the display screen and enable the mobile device to be in a vertically standing status without being held by the user is the issues to be solved by applicant.

Accordingly, the applicant of the present invention has devoted himself for improving the mentioned disadvantages

SUMMARY OF THE INVENTION

The disclosure is directed to a display device having rotary cover structure, in which a slide cover can be rotated to a rear cover with rotation shafts served as a center, thereby allowing the display device to be provided with an excellent operation convenience.

One of the exemplary embodiments, a disclosed example is to provide a display device having rotary cover structure, which includes: a display main body, having a display screen and a back cover oppositely arranged, two slide rails arranged at two sides of the display screen, and a side edge part vertically arranged between the two slide rails; two rotation shaft assemblies, disposed at the side edge part, and having two rotation shafts disposed corresponding to the two slide rails, wherein an axial core line of each of the rotation shafts is arranged to be parallel to a central line of the side edge part; and a slide cover, having two slide blocks sliding along the two slide rails and capable of being displaced between a shielding position for shielding the display screen and an exposing position allowing the display screen to be exposed; wherein when the slide cover is at the exposing position, each of the slide blocks and each of the rotation shafts are mutually mounted and connected via a mounting structure respectively, thereby enabling the slide cover to be rotated to the back cover with the two rotation shafts served as a center.

Based on what has been disclosed above, when the display device is transversally placed, and the slide cover is at the exposing position, the slide cover is able to be rotated to the rear cover via the rotation shafts, thus a situation of the slide cover downwardly sliding to shield the display screen due to the gravity can be prevented.

Based on what has been disclosed above, when the slide cover is rotated to the rear cover, a reverse-V-shaped status is formed by the display main body and the slide cover, the slide cover can be served as a supporter to the display main body, thereby enabling the display device to stand on a planar surface, for example a table surface, thereby increasing operation conveniences of the display device.

DETAILED DESCRIPTION OF THE DISCLOSED EXAMPLE

Figure 1:
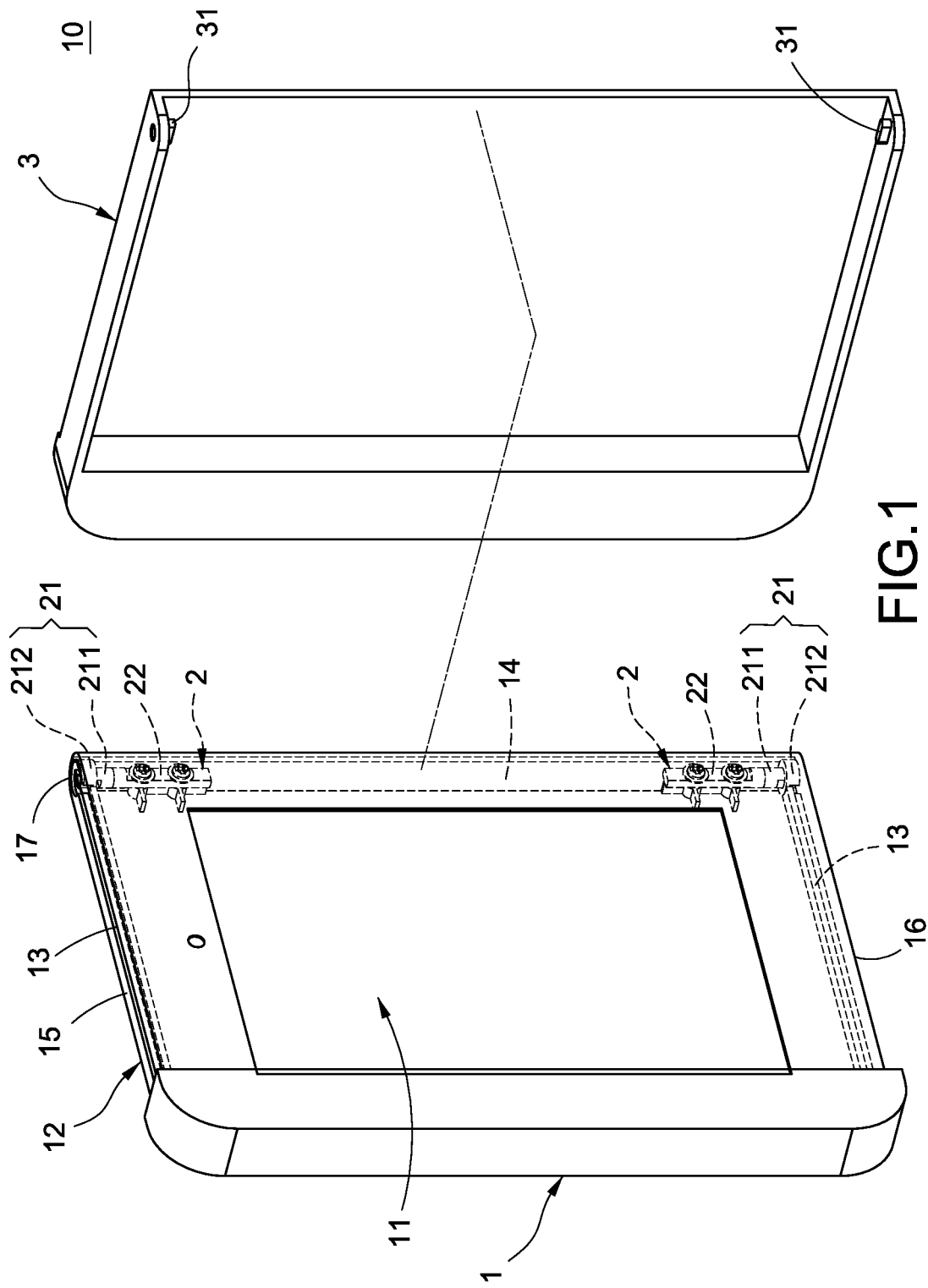
FIG. 1 is a perspective exploded view showing a display device according to a disclosed example.
Figure 2:
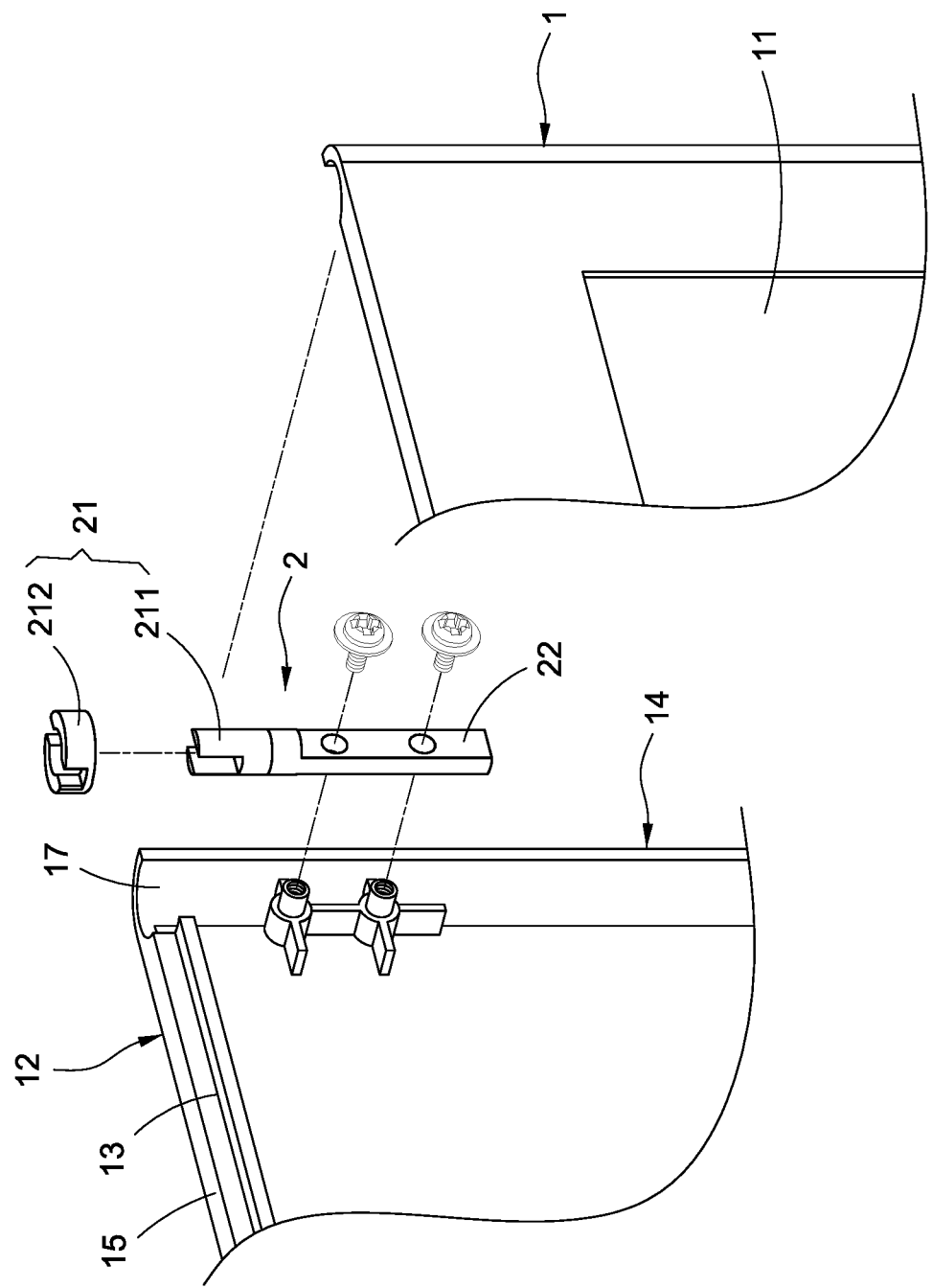
FIG. 2 is another perspective exploded view showing the display device according to the disclosed example.

A preferred embodiment of the disclosed example will be described with reference to the drawings.

Please refer from FIG. 1 to FIG. 7, the disclosed example is a display device having rotary cover structure. The display device 10 mainly includes a display main body 1, two rotation shaft assemblies 2 and a slide cover 3.

As shown from FIG. 1 to FIG. 7, the display main body 1 has a display screen 11 and a back cover 12 oppositely arranged, two slide rails 13 arranged at two sides of the display screen 11, and a side edge part 14 vertically arranged between the two slide rails 13.

Details are provided as follows. The display main body 1 further has a top end 15 and a bottom end 16, the side edge part 14 is disposed between the top end 15 and the bottom end 16 with a vertically arranging means, the two slide rails 13 are formed at the top end 15 and the bottom end 16 respectively, and two pivotal holes 17 communicated with the two slide rails 13 are formed at connected locations of the side edge part 14, the top end 15 and the bottom end 16.

As shown from FIG. 1 to FIG. 7, the two rotation shaft assemblies 2 are disposed at the side edge part 14, and the two rotation shaft assemblies 2 have two rotation shafts 21 disposed corresponding to the two slide rails 13 and two fixed rods 22 fixed at the side edge part 14, each of the rotation shafts 21 is pivoted to each of the fixed rods 22, and an axial core line L2 of each of the rotation shafts 21 is arranged to be parallel to a central line L1 of the side edge part 14.

Details are provided as follows. Each of the rotation shafts 21 has a first rotation shaft 211 pivoted to each of the fixed rods 22 and a second rotation shaft 212 sleeved on the first rotation shaft 211; but what shall be addressed is that the scope of the disclosed example is not limited to the above-mentioned arrangement, the first rotation shaft 211 and the second rotation shaft 212 can also be integrally formed as one piece, each of the first rotation shafts 211 and each of the second rotation shafts 212 jointly define individual non-circular recess 42, and each of the second rotation shafts 212 is pivoted in each of the pivotal holes 17.

Figure 3:
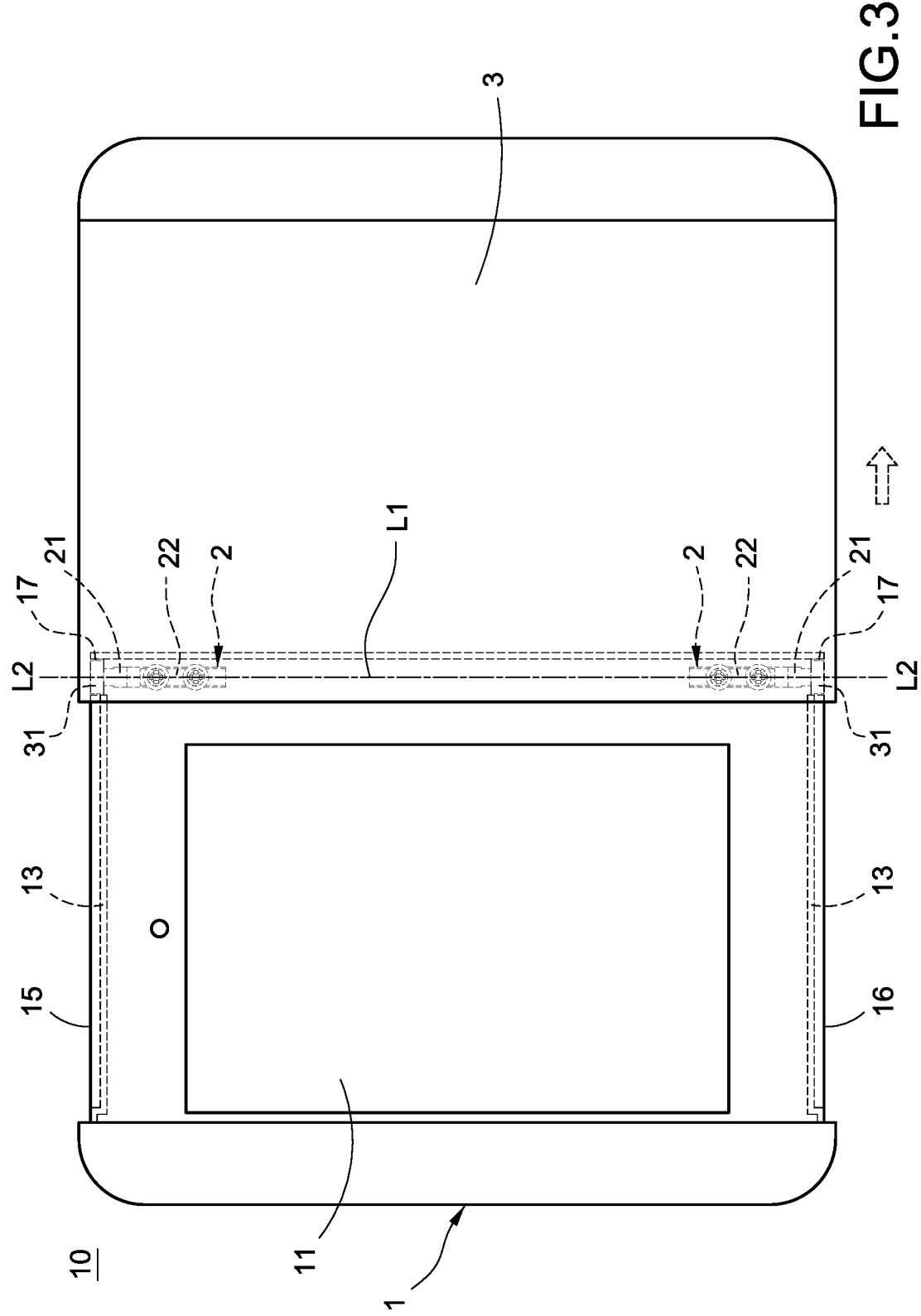
FIG. 3 is a schematic view showing the assembly of the display device according to the disclosed example.
Figure 4:
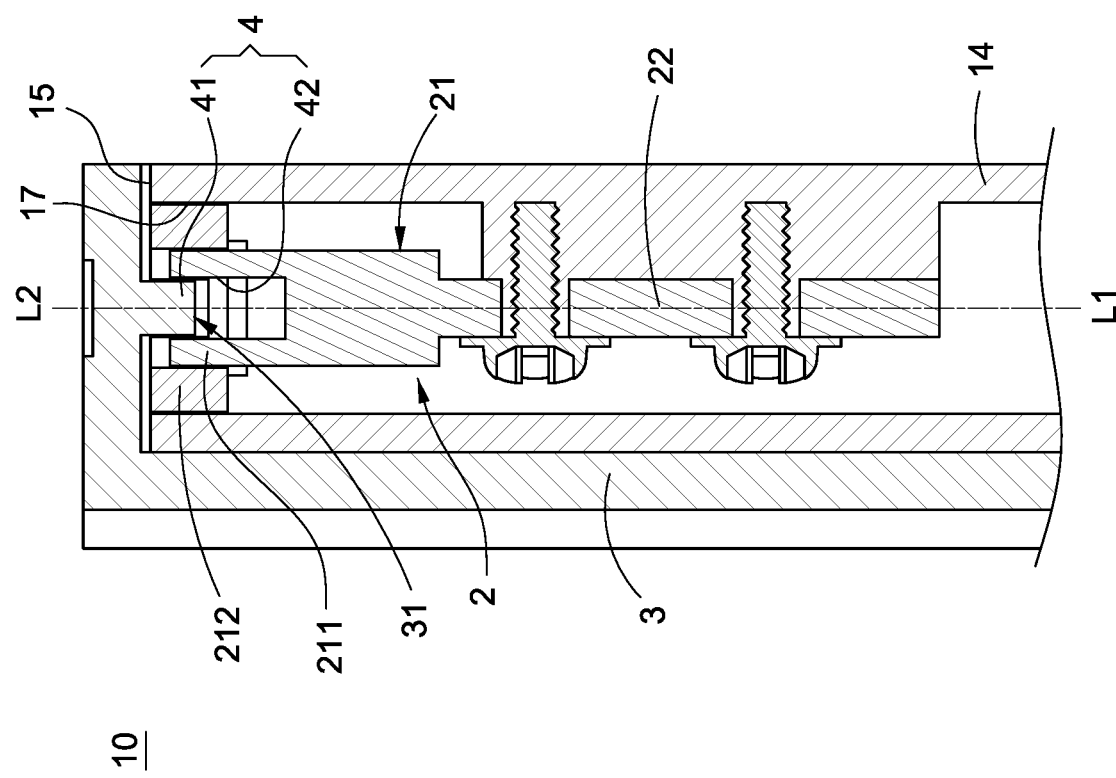
FIG. 4 is a cross sectional view showing the display device according to the disclosed example.
Figure 5:
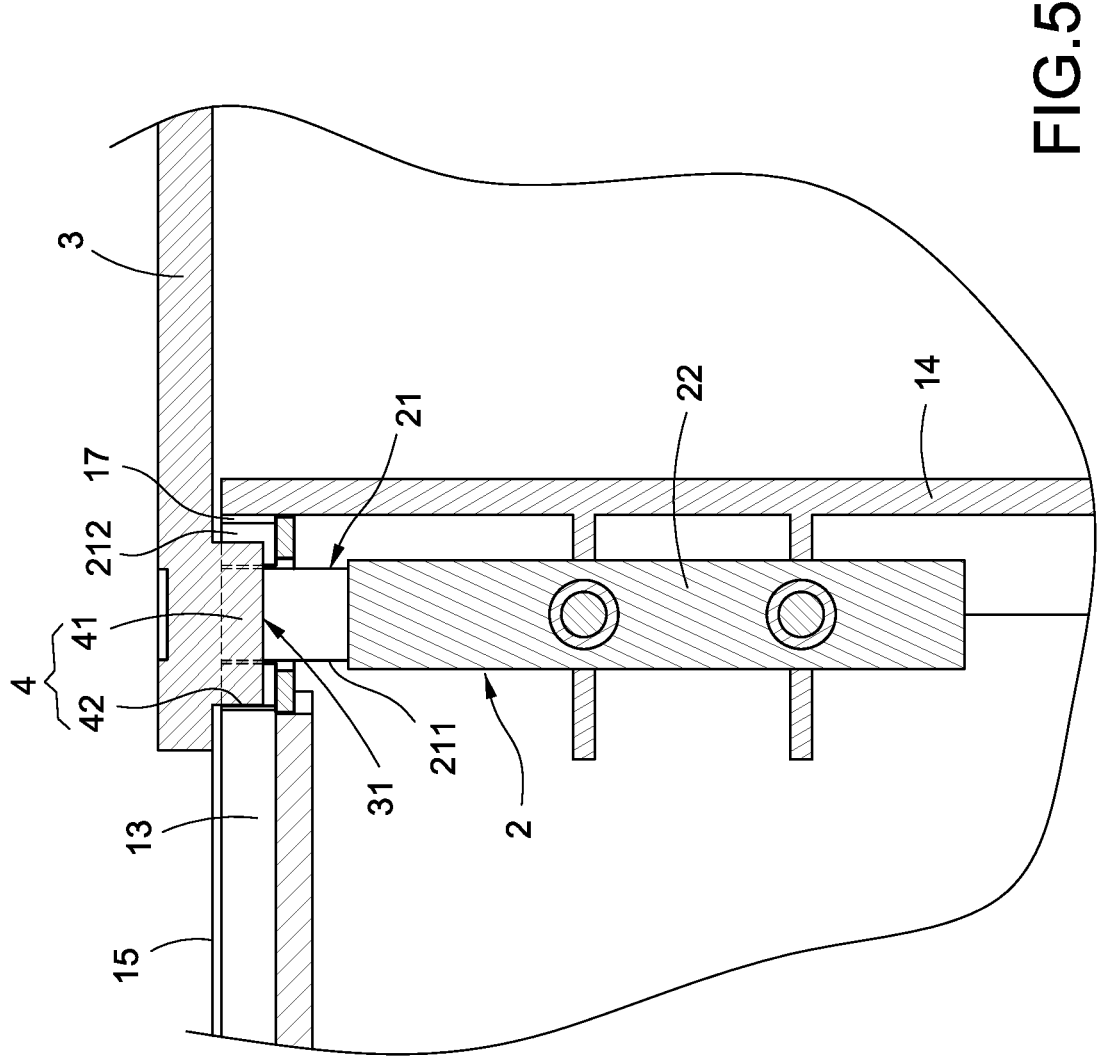
FIG. 5 is another cross-sectional view showing the display device according to the disclosed example.
Figure 6:
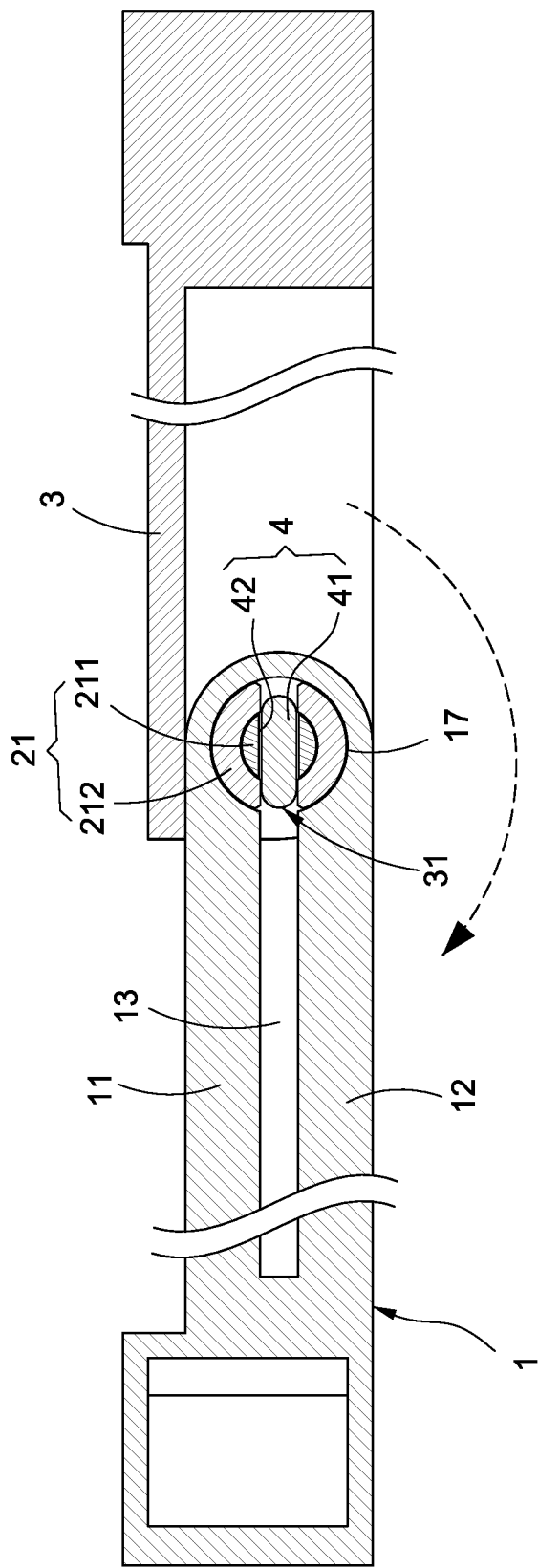
FIG. 6 is a schematic view showing an operating status of the display device according to the disclosed example.
Figure 7:
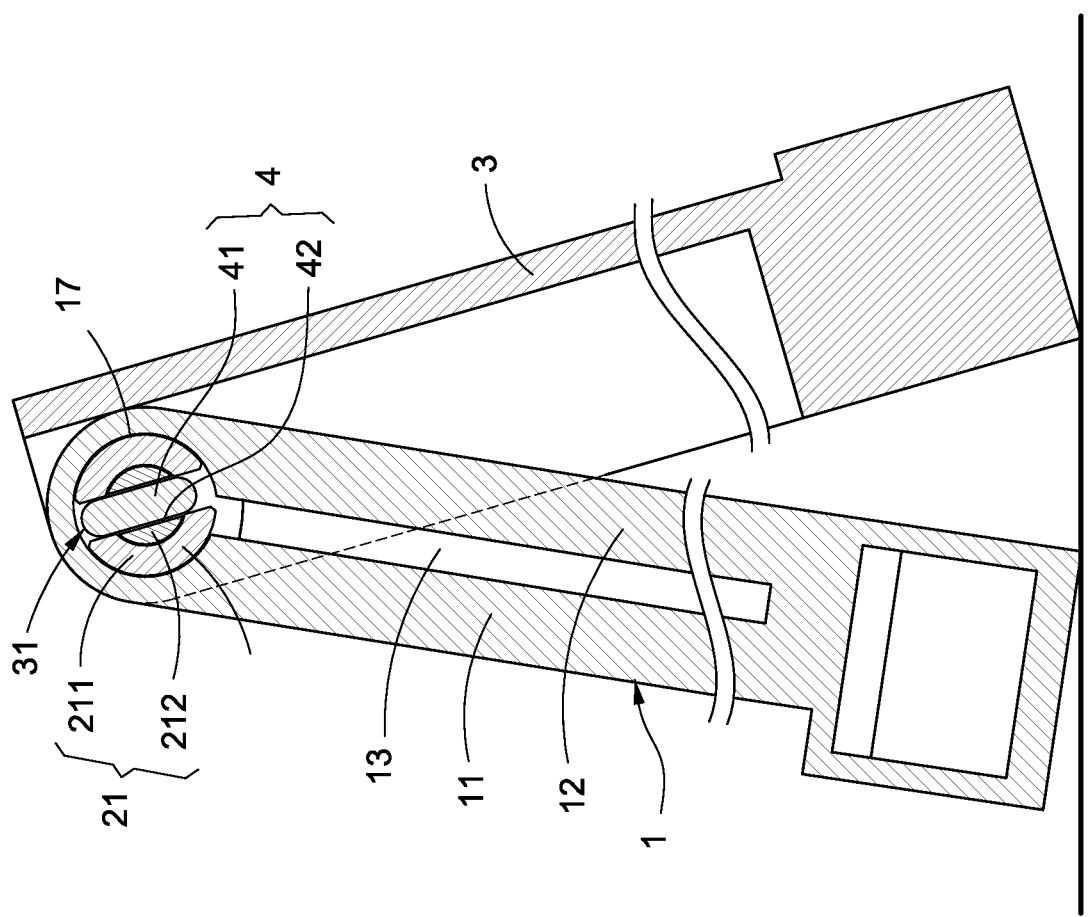
FIG. 7 is a schematic view showing another operating status of the display device according to the disclosed example.

As shown in FIG. 1, FIG. 3 and FIG. 7, the slide cover 3 has two slide blocks 31 capable of sliding along the two slide rails 13, so that the slide cover 3 is able to be displaced between a shielding position for shielding the display screen 11 and an exposing position allowing the display screen 11 to be exposed.

Wherein, when the slide cover 3 is at the exposing position, each of the slide blocks 31 and each of the rotation shafts 21 are mutually mounted and connected via a mounting structure 4 respectively, thereby enabling the slide cover 3 to be rotated to the back cover 12 with the two rotation shafts 21 served as a center.

As shown from FIG. 4 to FIG. 7, each of the mounting structures 4 has a non-circular tenon 41 formed on each of the slide blocks 31 and the non-circular recess 42 formed on each of the rotation shafts 21, and each of the non-circular tenons 41 is able to be mounted in each of the non-circular recesses 42.

As shown from FIG. 3 to FIG. 7, operating statuses of the display device 10 of the disclosed example are provided. When the two slide blocks 31 slide along the two slide rails 31 until the slide cover 3 is at the exposing position, each of the slide blocks 31 and each of the rotation shafts 21 are mutually mounted via the mounting structure 4 respectively, so that each of the slide blocks 31 is able to be rotated with each of the rotation shafts 21, thereby enabling the slide cover 3 to be rotated to the rear cover 12 with the two rotation shafts 21 served as the center.

Accordingly, when the display device 10 is transversally placed, and the slide cover 3 is at the exposing position, the slide cover 3 is able to be rotated to the rear cover 12 via the rotation shafts 21, thus a situation of the slide cover 3 downwardly sliding to shield the display screen 11 due to the gravity can be prevented; when the slide cover 3 is rotated to the rear cover 12, a reverse-V-shaped status is formed by the display main body 1 and the slide cover 3, thus the slide cover 3 can be served as a supporter to the display main body 1, thereby enabling the display device 10 to stand on a planar surface, for example a table surface, and a user does not need to perform an unnecessary action for holding the display device 10, the display main body 1 can be in a transversally standing status for allowing the user to play games or watch a video, thereby increasing operation conveniences of the display device 10.

Moreover, according to the disclosed example, an outer surface of the slide cover 3 is formed as a mirror surface, what shall be addressed is that the scope of the disclosed example is not limited to the above-mentioned arrangement; when the slide cover 3 is at the exposing position, the mirror surface of the slide cover 3 is able to be arranged at the same side as the display screen 11, so that the user can look in the mirror surface for viewing his/her reflection and can also detect his/her skin condition, receive skin caring or cosmetics suggestions, watch a video or operate an APP via the display screen 11, thereby achieving a function of intelligent mirror available in the market.

Although the disclosed example has been described with reference to the foregoing preferred embodiment, it will be understood that the disclosed example is not limited to the details thereof. Various equivalent variations and modifications can still occur to those skilled in this art in view of the teachings of the present disclosed example. Thus, all such variations and equivalent modifications are also embraced within the scope of the disclosed example as defined in the appended claims.

What is claimed is:

1. A display device having rotary cover structure, including:
   a display main body (1), having a display screen (11) and a back cover (12) oppositely arranged, two slide rails (13) arranged at two sides of the display screen (11), and a side edge part (14) vertically arranged between the two slide rails (13);
   two rotation shaft assemblies (2), disposed at the side edge part (14), and having two rotation shafts (21) disposed corresponding to the two slide rails (13), wherein an axial core line (L2) of each of the rotation shafts (21) is arranged to be parallel to a central line (L1) of the side edge part (14); and
   a slide cover (3), having two slide blocks (31) sliding along the two slide rails (13) and capable of being displaced between a shielding position for shielding the display screen (11) and an exposing position allowing the display screen (11) to be exposed; wherein, when the slide cover (3) is at the exposing position, each of the slide blocks (31) and each of the rotation shafts (21) are mutually mounted and connected via a mounting structure (4) respectively, thereby enabling the slide cover (3) to be rotated to the back cover (12) with the two rotation shafts (21) served as a center;
   wherein each of the mounting structures (4) has a non-circular tenon (41) formed on each of the slide blocks (31) and a non-circular recess (42) formed on each of the rotation shafts (21), and each of the non-circular tenons (41) is mounted in each of the non-circular recesses (42);
   wherein the two rotation shaft assemblies (2) further have two fixed rods (22) fixed at the side edge part (14), and each of the rotation shafts (21) is pivoted to each of the fixed rods (22).

2. The display device having rotary cover structure according to claim 1, wherein each of the rotation shafts (21) has a first rotation shaft (211) pivoted to each of the fixed rods (22) and a second rotation shaft (212) sleeved on the first rotation shaft (211), and the first rotation shaft (211) and the second rotation shaft (212) jointly define the non-circular recess (42).

3. The display device having rotary cover structure according to claim 2, wherein the display main body (1) further has a top end (15) and a bottom end (16), the two slide rails (13) are formed at the top end (15) and the bottom end (16) respectively, two pivotal holes (17) communicated with the two slide rails (13) are formed at connected locations of the side edge part (14), the top end (15) and the bottom end (16), and each of the second rotation shafts (212) is pivoted in each of the pivotal holes (17).

4. The display device having rotary cover structure according to claim 1, wherein an outer surface of the slide cover (3) is formed as a mirror surface.

* * * * *